United States Patent [19]

Cordy, Jr.

[11] Patent Number: 4,459,539
[45] Date of Patent: Jul. 10, 1984

[54] CHARGE TRANSFER CONSTANT VOLT-SECOND REGULATOR

[75] Inventor: Clifford B. Cordy, Jr., Corvallis, Oreg.

[73] Assignee: Hewlett-Packard Company, Palo Alto, Calif.

[21] Appl. No.: 397,268

[22] Filed: Jul. 12, 1982

[51] Int. Cl.³ .............................................. G05F 5/00
[52] U.S. Cl. ..................................... 323/299; 323/288
[58] Field of Search ........ 323/288, 299, 242, 284–287, 323/351, 326

[56] References Cited

U.S. PATENT DOCUMENTS 3,579,090  5/1971  Madsen ................................. 323/284
3,959,714  5/1976  Mihelich .............................. 323/288
4,355,277  10/1982  Davis et al. ..................... 323/285 X

OTHER PUBLICATIONS

E. Hebenstreit, "Driving the SIPMOS Field-Effect-Transistor as a Fast Power Switch", Siemens Forsch U. Entwickl.-Ber Bd. 9 (1980) Nr. 4, (c) Springer-Verlag, 1980, pp. 200–204.

Primary Examiner—Peter S. Wong
Attorney, Agent, or Firm—Jeffery B. Fromm

[57] ABSTRACT

A voltage regulator circuit is disclosed which utilizes the stored charge on the intrinsic gate capacitance of a field effect transistor as the means to switch the power in a switch mode voltage regulator in conjunction with a constant volt-second regulator, where the stored charge is derived from the timing capacitor.

11 Claims, 7 Drawing Figures

CHARGE TRANSFER CONSTANT VOLT-SECOND REGULATOR

BACKGROUND OF THE INVENTION

The purpose of a voltage regulator is to provide a constant DC output voltage independent of the input voltage. One approach to this is to chop the input voltage in such a way that as the input voltage goes up, the duty cycle of the chopper is reduced so that the product of the two is kept constant. This chopped voltage is then filtered, producing a DC output voltage. The output voltage is then equal to the product of the input voltage and the duty cycle. This is called a constant volt-second regulator or an $E\Delta t$ regulator. A simple block diagram of a volt-second regulator is shown in FIG. 1.

A description of a constant volt-second regulator appears below. The basic circuit described is shown in FIGS. 2 and 3. As the timing capacitor, $C_T$, charges past some reference voltage, $V_C$, the comparator driving the power switch turns off. The time required to charge $C_T$ to $V_C$ where $V_S$ is the unregulated supply voltage is $$t_{ON} = \frac{CV_C R_T}{V_S} = \frac{K_1}{V_S}.$$

The cycle time is $T = 0.8\, CV_S R_T/V_S = K_2$. Thus, the duty cycle $= K_3/V_S$ and the product of duty cycle and input voltage is $K_3$. The circuit as shown does not exactly obey this relationship because of the voltage offset of the diode. This is done as a simple means of avoiding the requirement that the comparators work with a zero input.

Note that: (1) The duty cycle timing and the full cycle timing are both performed by the same capacitor $C_T$; (2) The sense level, $V_C$, is constant; and (3) The peak capacitor voltage is proportional to $V_S$.

The advantage of this prior circuit is that it provides a semi-regulated output (±several percent) over a wide range of input voltage without the need for a high gain feedback loop and all its associated complexity.

Unfortunately this circuit, and the ones using feedback, share the disadvantage of needing low power supplies to continuously drive the regulator circuit and the power switch. These supplies must be in operation before the main regulator will function and become a major part of the overall cost and complexity of the entire regulator.

SUMMARY OF THE INVENTION

In accordance with the illustrated preferred embodiments, the present invention provides a means for utilizing a power MOSFET as a drive switch in a switch mode power supply so that it is no longer necessary to supply continuous drive to the power switch. It is sufficient to deliver an energy pulse to charge the input capacitance of the FET to turn it on and the FET can then be ignored by the regulator until such time that the state of the FET should be changed. The charge in the gate capacitance of the FET can then be dumped and the FET will stay off. This method of running a FET switch is combined with a charge transfer driver in a constant volt-second regulator forming a novel low power dissipation, highly efficient power supply capable of implementation without the need of any low power supplies to drive the regulator circuit or the power switch.

DETAILED DESCRIPTION OF THE DRAWINGS

DETAILED DESCRIPTION OF THE INVENTION

With the advent of power MOSFETs, a new option is open to the power supply designer. It is no longer necessary to supply continuous drive to the power switch, as is required with bipolar switches; it is sufficient to deliver an energy pulse to charge the input capacitance of the FET to turn it on. The FET can then be ignored by the regulator until such time that the state of the FET should be changed. The charge in the input capacitance of the FET can then be dumped and the FET will stay off.

Figure 1:
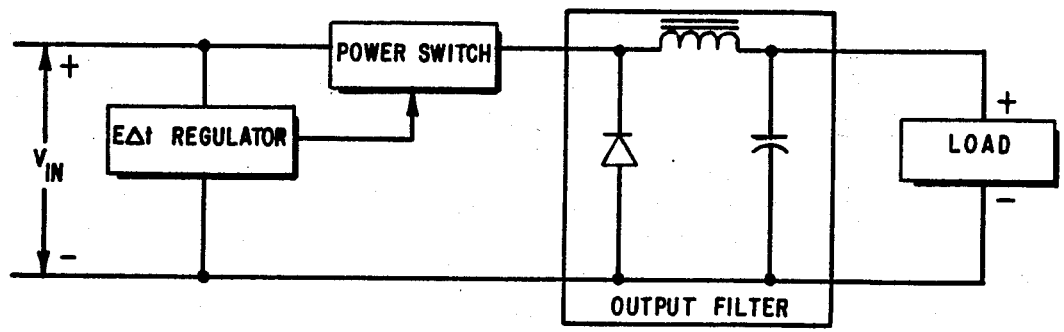
FIG. 1 is a simple block diagram of a constant volt-second regulator.
Figure 2:
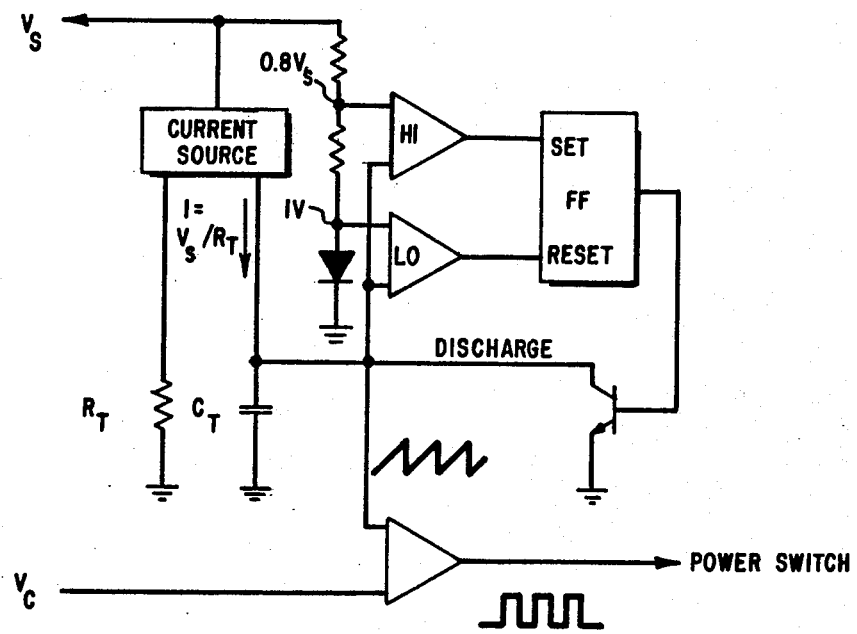
FIG. 2 is a basic schematic of a prior art constant volt-second regulator.
Figure 3:
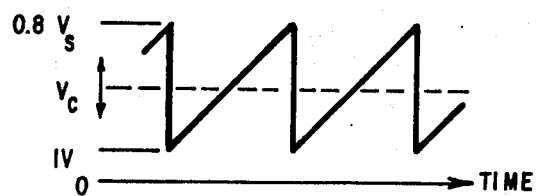
FIG. 3 is the timing diagram for the circuit in FIG. 2.
Figure 3:
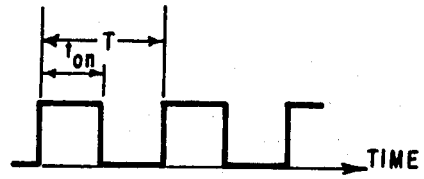

The constant volt-second regulator has a readily available charge source for driving the FET—the charged capacitor $C_T$ of FIG. 2. This is not immediately usable for two reasons. First, there is no direct connection between $C_T$ and the power switch. Second, the peak voltage on $C_T$ is directly proportional to $V_S$ which is unacceptable from the point of view of the FET. These two problems can be solved if they are attacked in reverse order.

Figure 4:
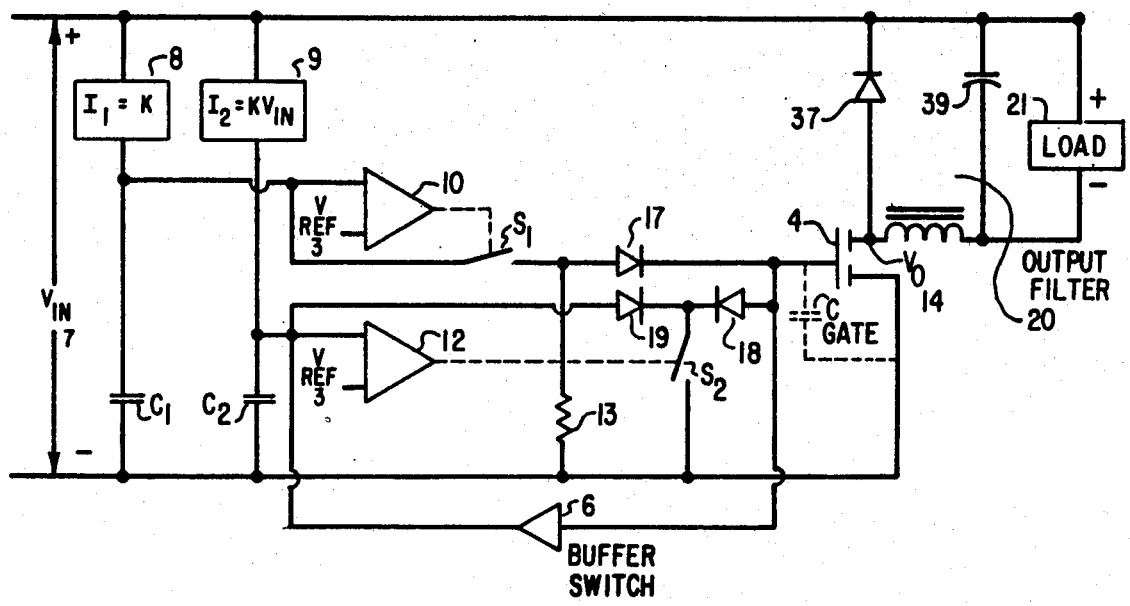
FIG. 4 is one embodiment of the claimed charge transfer constant volt-second regulator with the full cycle and duty cycle functions split between two capacitors.

As pointed out in the discussion of the operation of the standard constant volt-second regulator, the duty cycle timing and the full cycle timing are both performed by $C_T$. The "cost" of this union is the variability of the peak voltage of $C_T$. Splitting the two functions between two capacitors $C_1$ and $C_2$, as shown in FIG. 4, allows the design of a circuit in which the timing capacitors charge to constant peak voltages. This voltage may be the same for the two capacitors but this is not necessary.

The cycle time is defined by $C_1$. This charges from the current source 8 at a constant rate until it reaches the reference voltage 3. Its charge is then dumped into a resistor 13 and the gate capacitance 14 of the FET 4 thru a first switch $S_1$, which switch is closed only briefly.

When the FET 4 gate capacitance is charged, the buffer switch 6 allows $C_2$ to start charging from a second current source 9 which is proportional to $V_{IN}7$. $C_1$ also starts charging. The voltage on $C_2$ reaches $V_{REF}3$ in a time inversely proportional to $V_{IN}7$, at which time its charge and the charge of the FET 4 gate capacitance 14 are dumped to ground through a second switch $S_2$ as determined by comparator 12. Rectifiers 17, 18, and 19 are used to prevent current from flowing backwards into $C_1$, $C_{GATE}$14, and $C_2$ respectively. Finally, an output filter 20 is provided to provide a direct current voltage to the load 21. Because of the polarity of available FETs, the power switch 4 is in the negative supply line. There is no fundamental requirement for this. The entire circuit could be built in complementary form.

The actual switching of $S_1$ and $S_2$ can be implemented in a wide variety of ways. A simple means is to use transistors pairs operated in an avalanche discharge mode as shown in FIG. 6 as $S_{15}$ and $S_{16}$, comprised of transistors 31 and 32 and diode 33, and transistors 34 and 35 and diode 36, respectively.

Figure 5:
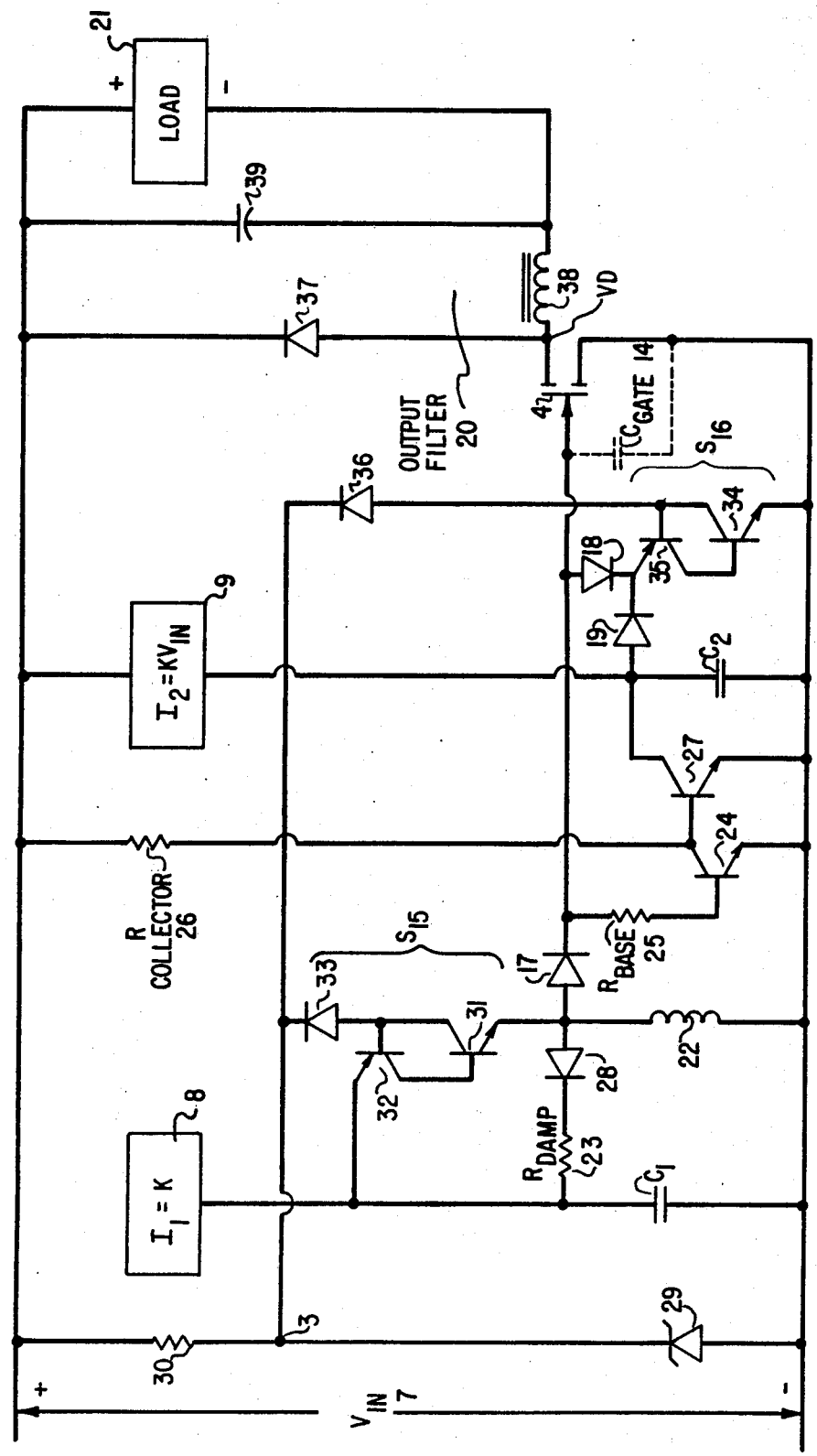
FIG. 5 is a second embodiment of the claimed circuit similar to operating from the supply lines without the need for any low voltage supplies.

The entire circuit of FIG. 5 is shown operating from the supply lines with no low voltage supplies necessary. Looking at FIG. 5 in conjunction with the timing diagrams of FIGS. 6A and 6B, a reference voltage 3 is shown generated from $V_{IN}$7 by reference diode 29 and resistor 30, as before and the full cycle capacitor $C_1$ is charged from a current source 8 and a second current source 9 is used to charge the duty cycle capacitor $C_2$. $C_1$ charges at a constant rate independent of the input voltage 7 until it reaches $V_{REF}$3. Switch 15 then turns on and $C_1$ is dumped through an inductor 22. On the reverse half cycle, switch 15 is reverse biased and thus turns off. The damping resistor 23 is such that the oscillation on the reverse half cycle is critically damped, leaving the voltage on $C_1$ at zero volts at the end of the discharge cycle. The fourth rectifier 28 is provided so that the charge on $C_1$ will not discharge through inductor 22.

When the intrinsic gate capacitance 14 is charged, an inverting transistor 24, biased by the base resistance 25, turns on pulling down on the collector resistance 26 and turning the open collector output transistor 27 off, and $C_2$ is allowed to charge. $C_2$ charges from the second current source 9 at a rate proportional to $V_{IN}$7 until the voltage on $C_2$ reaches $V_{REF}$3. Switch 16 is then turned on and the charge on both $C_2$ and the intrinsic gate capacitance 14 is dumped. Once the charge on $C_2$ and the intrinsic gate capacitance 14 has dumped there is no remaining current source for switch 16 and switch 16 will automatically turn off.

Figure 6A:
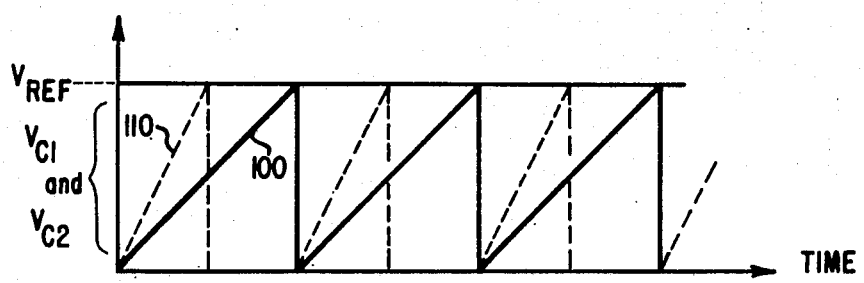
FIG. 6A is a timing diagram for the circuits of FIGS. 4 and 5 showing the voltages on the full cycle and duty cycle capacitors.
Figure 6B:
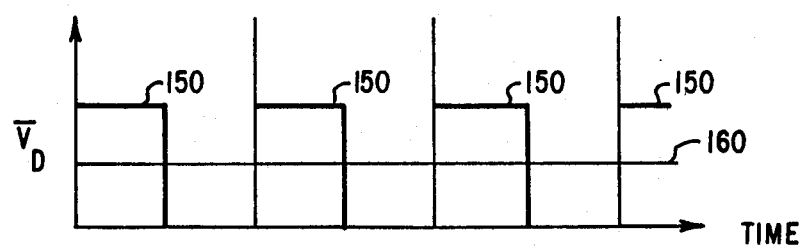
FIG. 6B is a timing diagram for the circuits of FIGS. 4 and 5 showing the inverse of the output of the power switch.

In FIG. 6A, the voltage on the full cycle capacitor $C_1$ is shown as solid line 100. If $V_{IN}$7 is just equal to the desired voltage on the load 21, the relation between $C_1$, $C_2$, current source 8, and current source 9 is such that $C_2$ charges at the same rate as $C_1$; the intrinsic gate capacitance 14 is dumped instananeously and the FET 4 is on at all times. The result is that in FIG. 6 the voltage on duty cycle capacitor $C_2$ will overlay the solid line 100 that shows the voltage on the full cycle capacitor $C_1$. If on the other hand $V_{IN}$7 is twice as high as the desired load voltage, the voltage on $C_2$ charges twice as fast as shown by the dashed curve 110 while the voltage on $C_1$ remains as shown by solid line 100 and the FET 4 is on only half of the time. A similar situation occurs for $V_{IN}$7 which is any other multiple of the desired load voltage and the duty cycle is reduced proportionately. The voltage on the power terminal $V_D$ of the FET power switch 14, shown inverted as $\overline{V}_D$ in FIG. 6B when $V_{IN}$7 is twice as high as the desired load voltage, has a duty cycle 150 proportional to the period on $C_2$. When this waveform is integrated by the output filter 20 as shown by line 160, the output voltage to the load 21 is independent of the input voltage 7.

Supplies have been built using the disclosed invention that will deliver over 100 watts (2 amps at 50 volts regulated) with $V_{IN}$ varying between 100 and 400 volts and with less than 1 watt dissipated in the entire regulator circuit, even at 400 volts input.

I claim:

1. A direct current voltage regulator circuit for regulating an input voltage comprising:
    a reference voltage;
    a constant volt-second regulator coupled to said reference voltage, said constant volt-second regulator having two timing means, the first of said timing means for defining the full cycle time of said constant volt-second regulator, the second of said timing means for defining the duty cycle time of said constant volt-second regulator;
    a power switch coupled to said constant volt-second regulator; and
    an output filter coupled to said power switch to produce a direct current output voltage.

2. A direct current voltage regulator circuit as set forth in claim 1 wherein said first timing means comprises:
    a capacitor coupled so as to be charged to a constant peak voltage level for controlling said power switch means.

3. A direct current voltage regulator circuit for regulating an input voltage comprising:
    a reference voltage;
    a full cycle timing capacitor;
    a first current source coupled to charge said full cycle timing capacitor;
    a first switch coupled so as to close when the voltage on said full cycle timing capacitor is equal to or greater than said reference voltage and to open when said full cycle timing capacitor is discharged;
    a discharge element coupled to the output of said first switch means;
    a duty cycle timing capacitor;
    a second current source proportional to said direct current input voltage coupled to charge said duty cycle timing capacitor;
    a second switch coupled so as to close when the voltage on said duty cycle timing capacitor is equal to or greater than said reference voltage and to open when said duty cycle timing capacitor is discharged;
    a power switch, said power switch having a control terminal;
    a first unidirectionally conductive element coupled between the output of said first switch and said power switch control terminal;
    a third capacitor coupled to said power switch control terminal;
    a second unidirectionally conductive element coupled between said third capacitor and said second switch;
    a third unidirectionally conductive element coupled between said duty cycle capacitor and said second switch;
    a third switch coupled to close and shunt said duty cycle capacitor when said third capacitor is charged and to open when said third capacitor is discharged; and
    an output filter coupled to said power switch to produce a direct current output voltage.

4. A direct current voltage regulator circuit as set forth in claim 3, wherein said reference voltage comprises:
- a third current source coupled to said input voltage; and
- a reference diode coupled to said third current source.

5. A direct current voltage regulator circuit as set forth in claim 3, wherein said first or second switch comprises:
- a pair of transistors and a diode coupled so as to operate in the avalanche discharge mode.

6. A direct current voltage regulator circuit as set forth in claim 3, wherein said third switch comprises:
- an open collector output transistor;
- an inverting transistor having a load terminal coupled to said open collector output transistor and a control terminal;
- a collector resistor coupled to said load terminal of said inverting transistor; and
- a control resistor coupled to said control terminal of said inverting transistor.

7. A direct current voltage regulator circuit as set forth in claim 3, wherein said discharge means comprises:
- an inductor;
- a fourth unidirectionally conductive device coupled to said inductor; and
- a damping resistor coupled between said fourth unidirectionally conductive device and said full cycle timing capacitor.

8. A direct current voltage regulator circuit as set forth in claim 1 or 3, wherein said power switch comprises:
- a metal oxide semiconductor field effect transistor.

9. A direct current voltage regulator circuit for regulating an input voltage comprising:
- a reference voltage;
- a full cycle timing capacitor;
- a first current source coupled to charge said full cycle timing capacitor;
- a first switch coupled so as to close when the voltage on said full cycle timing capacitor is equal to or greater than said reference voltage and to open when said full cycle timing capacitor is discharged;
- a discharge element coupled to the output of said first switch means;
- a duty cycle timing capacitor;
- a second current source proportional to said direct current input voltage coupled to charge said duty cycle timing capacitor;
- a second switch coupled so as to close when the voltage on said duty cycle timing capacitor is equal or to greater than said reference voltage and to open when said duty cycle timing capacitor is discharged;
- a metal oxide semiconductor field effect transistor switch, said field effect transistor switch having a control terminal;
- a first unidirectionally conductive element coupled between the output of said first switch and said field effect transistor switch control terminal, said control terminal having intrinsic capacitance;
- a second unidirectionally conductive element coupled between said field effect transistor switch control terminal and said second switch;
- a third unidirectionally conductive element coupled between said duty cycle capacitor and said second switch;
- a third switch coupled to close and shunt said duty cycle capacitor when said intrinsic capacitance is charged and to open when said intrinsic capacitance is discharged; and
- an output filter coupled to said power switch to produce a direct current output voltage.

10. A constant volt-second voltage regulator comprising:
- first timing means for defining the full cycle time of said constant volt-second voltage regulator; and
- second timing means coupled to said first timing means for defining the duty cycle time of said constant volt-second voltage regulator.

11. A constant volt-second voltage regulator as in claim 10 wherein said first and second timing means comprise a cycle time capacitor and a duty cycle capacitor, respectively.

* * * * *

UNITED STATES PATENT AND TRADEMARK OFFICE
CERTIFICATE OF CORRECTION

PATENT NO. : 4,459,539
DATED : July 10, 1984
INVENTOR(S) : Clifford B. Cordy, Jr.

It is certified that error appears in the above—identified patent and that said Letters Patent is hereby corrected as shown below:

Column 6, line 11, "or to" should read -- to or --.

Signed and Sealed this

Twenty-ninth Day of January 1985

[SEAL]

Attest:

DONALD J. QUIGG

Attesting Officer     Acting Commissioner of Patents and Trademarks